United States Patent [19]

Schmeets

[11] Patent Number: 5,799,961

[45] Date of Patent: Sep. 1, 1998

[54] QUICK-ATTACHABLE TRAILER STEP

[76] Inventor: Harold H. Schmeets, R.R. 2, Box 82, Harvey, N. Dak. 58341

[21] Appl. No.: 662,997

[22] Filed: Jun. 17, 1996

[51] Int. Cl.$^6$ .................... E06C 1/00; B60R 3/00
[52] U.S. Cl. .................... 280/163; 182/92; 280/169
[58] Field of Search .................... 182/92, 120, 53, 182/54, 55, 56, 57, 58, 59; 280/163, 169; 248/236

[56] References Cited

U.S. PATENT DOCUMENTS

| | | | |
|---|---|---|---|
| 789,683 | 9/1905 | Ketteman | 182/92 |
| 2,086,280 | 12/1937 | Matter | 182/90 |
| 3,561,786 | 2/1971 | Lentz . | |
| 3,799,288 | 3/1974 | Manuel . | |
| 4,611,552 | 9/1986 | Koppeloma Ki . | |
| 4,791,764 | 12/1988 | Hicks | 52/187 |
| 4,869,520 | 9/1989 | Cole | 280/164 |
| 4,907,647 | 3/1990 | Miller | 182/55 |
| 4,930,797 | 6/1990 | Parrill . | |
| 5,014,640 | 5/1991 | Owen, Sr. . | |
| 5,515,806 | 5/1996 | McCabe | 182/90 |

FOREIGN PATENT DOCUMENTS 406010689  1/1994  Japan .................... 280/163

*Primary Examiner*—Brian L. Johnson
*Assistant Examiner*—Jonathan E. Butts
*Attorney, Agent, or Firm*—David A. Lingbeck

[57] ABSTRACT

A quick-attachable trailer step includes a planar step member, two U-shaped mounting brackets fixedly attached to the back end of the step member with the open ends of the mounting brackets being disposed downwardly relative to the top of the step member, and two braces connected to the step member and to the mounting brackets to strengthen the trailer step. Each of the mounting brackets has a first extended portion and a second extended portion spaced from each other and defining a frame-receiving slot between each other, which is adapted to receive the portion of the frame of the trailer. The closed end of the mounting brackets essentially rest upon a portion of the frame of the trailer with the step member being disposed essentially horizontally outwardly from the trailer.

4 Claims, 5 Drawing Sheets

QUICK-ATTACHABLE TRAILER STEP

BACKGROUND OF THE INVENTION

This invention relates to a quick-attachable trailer step which can be quickly attached to and detached from the frame or the tongue of a trailer, in particular, a boat trailer.

All trailers and, in particular, boat trailers have frames on which the users thereof climb and stand upon to either enter the boat or get something out of the boat or even cover the boat while the boat is loaded upon the trailer. However, the frames of the boat trailers are usually narrow and located very close to the body of the boats making it very difficult for the users to stand on the frames let alone steady themselves on the narrow frames, and as is normally the case with mostly all boat trailers, there are no steps attached to the trailers so that the users can stand on the steps. The prior art does suggest steps attached to the frames of vehicles to assist the users thereof to enter the vehicles such as boats and trucks. However, such prior art is not easily attachable to the frames and when it is attached, it is not easily removed.

One known prior art is a VEHICLE ENTRANCE STEP APPARATUS, U.S. Pat. No. 3,561,786, issued on Feb. 9, 1971 and invented by Russell E. Lentz, which comprises a support assembly attached to the frame of a vehicle, a step assembly pivotally connected to the support assembly, and an actuator assembly connected to a movable door structure of the vehicle.

Another known prior art is a ROTATABLE STAIR ASSEMBLY ADAPTED FOR ATTACHMENT TO A VEHICLE PLATFORM, U.S. Pat. No. 3,799,288, issued on Mar. 26, 1974 and invented by Larry N. Manuel, which comprises two stair members, four support arms, two brackets, hinge fasteners for fastening the support arms to the brackets, and hinge fasteners for fastening the stair members to the support arms.

Another known prior art is BOARDING STEPS, U.S. Pat. No. 4,611,552, issued on Sep. 16, 1986 and invented by Leo Koppelomaki, which comprises two carrier arms, a tread platform supported by the carrier arms which are urged against the wall of the vehicle, an adjustment rail which is also urged against the wall of the vehicle, and support struts for anchoring the boarding step to the vehicle.

Another known prior art is a SAFETY STEP SYSTEM, U.S. Pat. No. 4,930,797, issued on Jun. 5, 1990 and invented by Lee R. Parrill, which comprises a planar step which is attached to two leg members which are pivotally attached to the floor of a van. The step can be folded out and down when the side door is opened.

Another known prior art is a STEP ASSEMBLY, U.S. Pat. No. 5,014,640, issued on May 14, 1991 and invented by H. Drew Owen, Sr., which comprises a mounting bracket and pivot block pivotally mounted on the mounting bracket for pivoting about a horizontal axis.

None of the prior art disclosed above describe a step which can be quickly attached to and detached from the frame of a trailer and which can be attached almost anywhere along the frame.

SUMMARY OF THE INVENTION

The present invention relates to a quick-attachable trailer step which comprises a step member having a back end and two sides, and further comprises two inverted U-shaped mounting brackets which are fixedly attached to the back end of the step member, and also comprises two brace members each of which is fixedly attached to a respective side of the step member and to a respective one of the mounting brackets. The trailer step is attachable to the outside frame of the trailer with the two mounting brackets being placed about the frame and two threaded members being inserted through the two mounting brackets to engage the frame so as to secure the trailer step to the trailer.

One objective of the present invention is to provide a quick-attachable trailer step which can be easily and conveniently mounted almost anywhere along the frame of the trailer, wherever the user needs to have the trailer step.

Another objective of the present invention is to provide a quick-attachable trailer step which can be quickly and easily removed from the trailer when not needed.

Yet, another objective of the present invention is to provide a quick-attachable trailer step which eliminates ladders and steps too cumbersome and troublesome to mount to the frame of the trailer.

Further objectives and advantages of the present invention will become apparent as the description proceeds and when taken in conjunction with the accompanying drawings wherein:

DETAILED DESCRIPTION OF THE INVENTION

Figure 1:
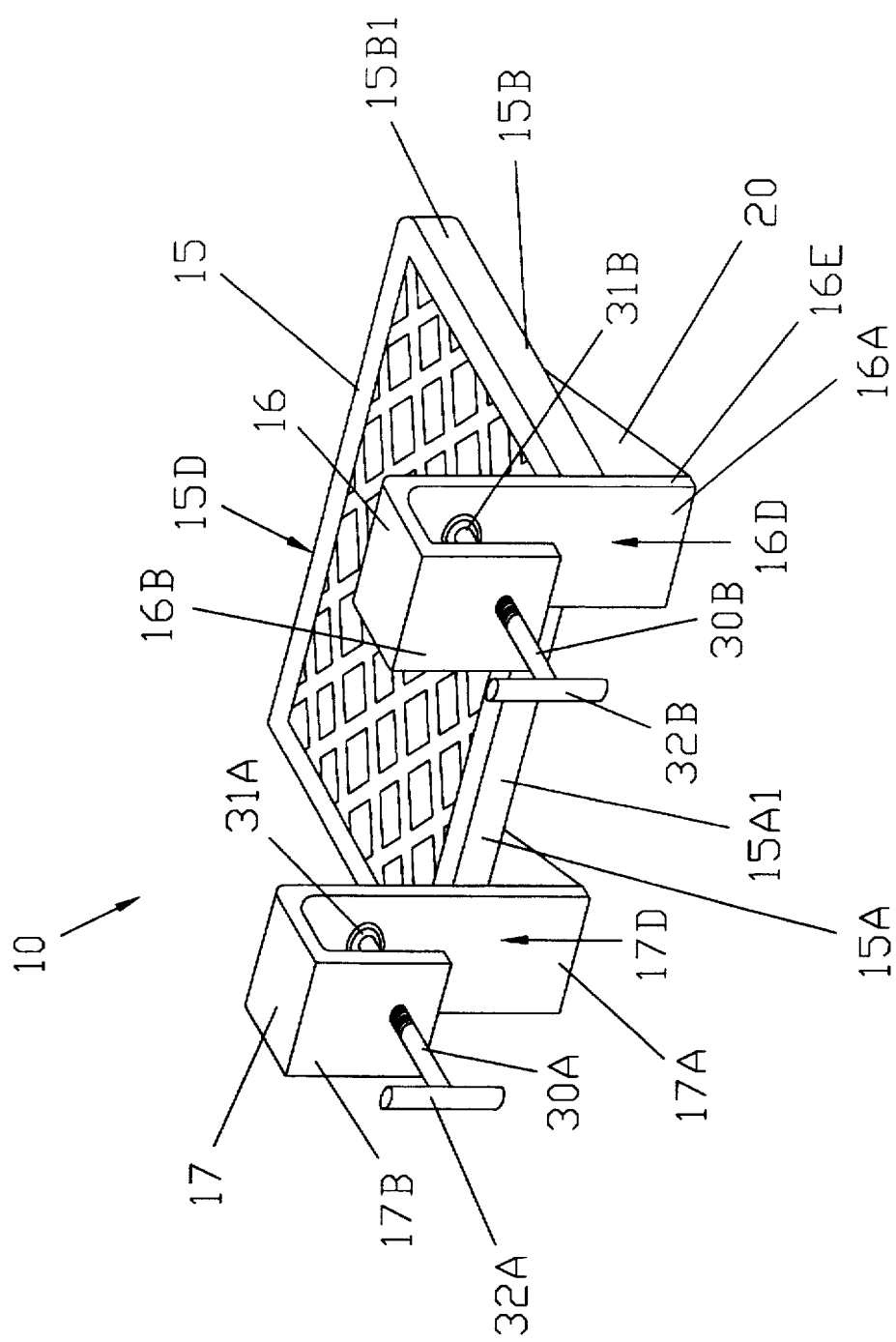
FIG. 1 is a perspective view of the quick-attachable trailer step.
Figure 2:
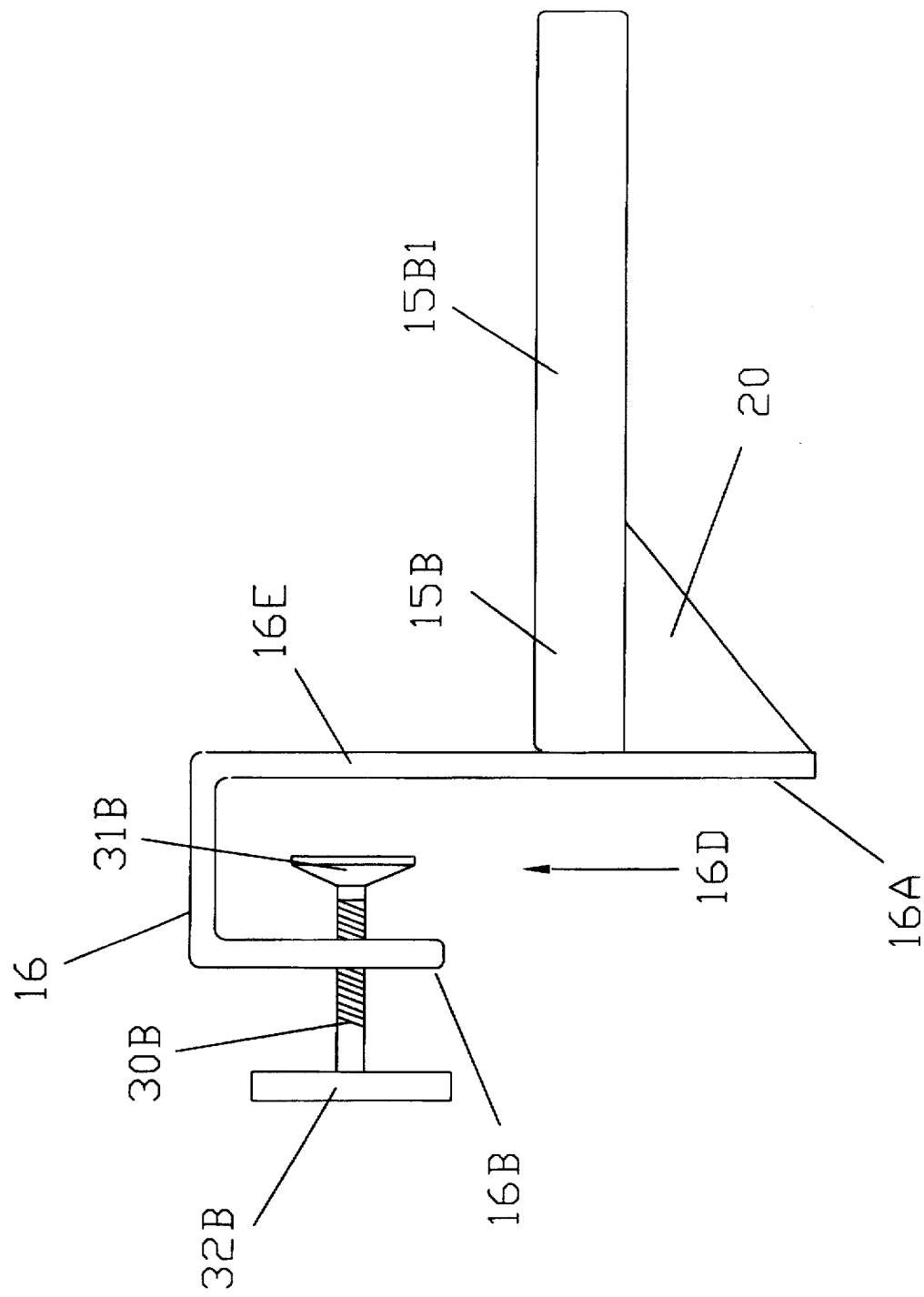
FIG. 2 is a side elevation view of the quick-attachable trailer step.
Figure 3:
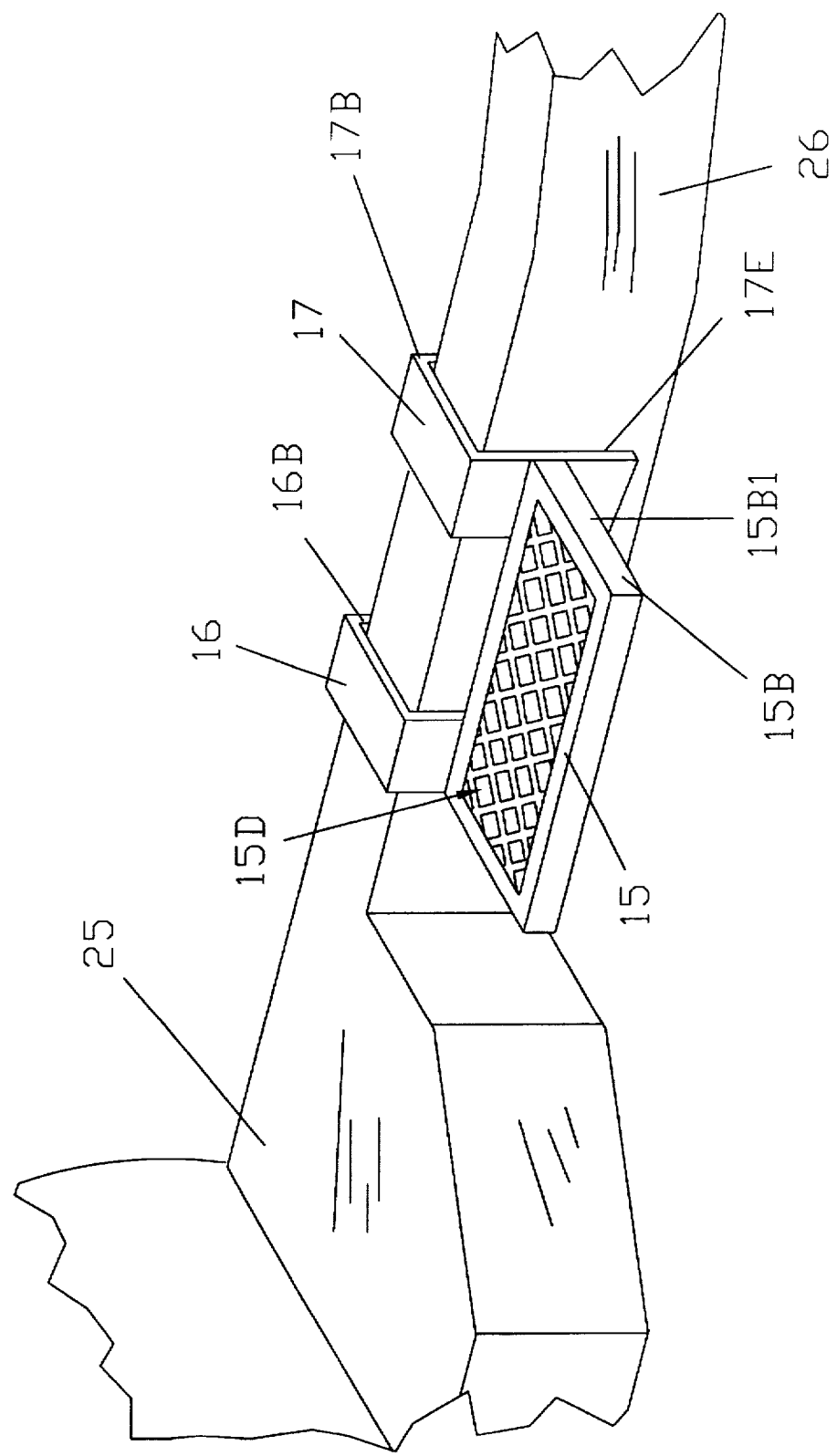
FIG. 3 is a perspective view of the quick-attachable trailer step positioned about the frame of a partially shown trailer.
Figure 4:
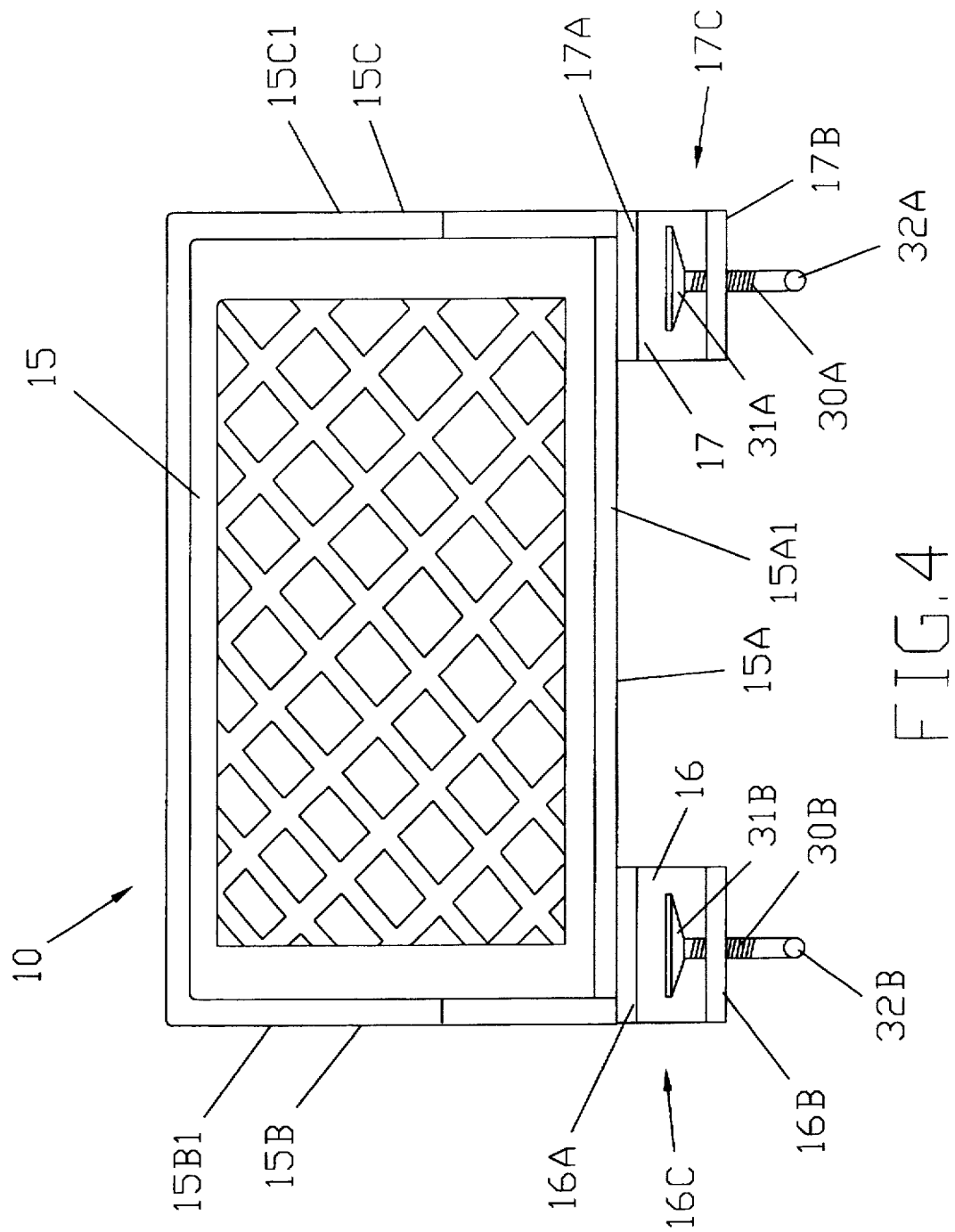
FIG. 4 is a bottom plan view of the quick-attachable trailer step.
Figure 5:
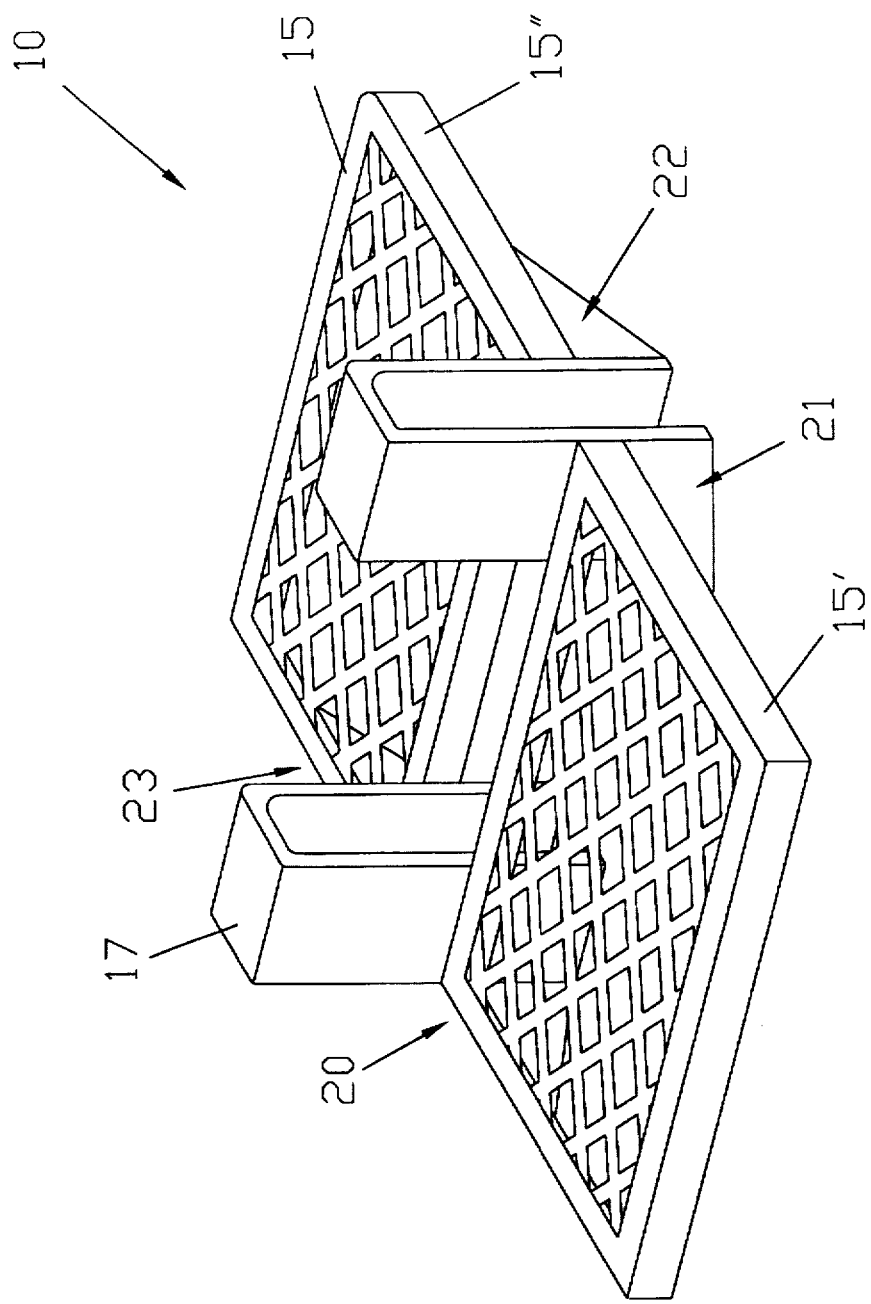
FIG. 5 is a perspective view of the quick-attachable trailer step.

Referring to FIGS. 1–5 of the drawings, in particular, the quick-attachable trailer step 10 comprises a planar step member 15 having a back end 15a, a mesh top 15d, two sides 15b–c, and two flange portions 15b1, 15c1 each of which extends along a respective one of the sides 15b–c. The trailer step 10 further includes two inverted U-shaped mounting brackets 16, 17 each of which has a first extended planar portion 16a, 17a and a second extended planar portion 16b, 17b spaced from the first extended planar portion 16a, 17a and defining a frame-receiving slot 16d, 17d between itself and the first extended planar portion 16a, 17a.

Each of the mounting brackets 16, 17 is fixedly attached at a medial portion thereof to the back end 15a of the planar step member 15 near a respective side 15b–c of the planar step member 15 with the second extended planar portion 16b, 17b of the respective mounting bracket 16, 17 having its outerside which faces away from the first extended planar portion 16a, 17a, fixedly attached to a flange portion 15a1 which extends downward and along the edge of the back end 15a of the step member 15 with the first extended planar portion 16a, 17a being spaced from the planar step member 15. The mounting brackets 16, 17 are spaced from one another so as to stabilize the trailer step 10 when mounted upon the frame 26 of a trailer 25, and are disposed or fixedly attached to the back end 15a of the planar step member 15 such that the open ends 16c, 17c of the mounting brackets 16, 17 are disposed downward relative to the top 15d of the planar step member 15.

To strengthen the trailer step 10, two brace members 20, 21 each of which is securely attached or welded to the flange portion 15b1, 15c1 on a respective side 15b–c of the step member 15 and to a respective mounting bracket 16, 17, and is fixedly attached near the back end of the step member 15 and near the bottom ends of the second extended planar portions 16b, 17b of the mounting brackets 16, 17.

The trailer step 10 is convenient and very easy to use. The user can position the trailer step 10 almost anywhere along the frame 26 of the trailer 25 including the tongue with the frame 26 of the trailer 25 being essentially an elongate member adapted to be received in the frame-receiving slots 16d, 17d formed between the first and second extended planar portions of the mounting brackets 16, 17. The trailer step 10 is removably and securely mounted upon and about a portion of the frame 26 of the trailer 25 with the closed end of the U-shaped mounting brackets 16, 17 essentially resting upon the top portion of the frame 26 and with two threaded members each having a threaded shaft 30a–b, an engaging flat-faced member 31a–b swivelly attached to an end of the respective threaded member and moveably disposed in the frame-receiving slot 16d, 17d for engaging a portion of the frame of the trailer, and a handle 32a–b at the other end thereof for threading the threaded member, said threaded members being threaded through holes 16f, 17f near the bottoms of the first extended portions 16b, 17b of each mounting bracket: 16, 17 for engaging the frame or the tongue such that the second extended portions 16a, 17a are tightly engaged to the sides of the portion of the frame of the trailer with the step member 15 extending generally horizontally outwardly from the trailer and from the frame of the trailer. If the user doesn't need the trailer step anymore, the user can thread out the threaded members so as to disengage the threaded members from the frame and then lift the trailer step off the frame 26 of the trailer 25.

As an alternate embodiment, the trailer step 10 includes two step members 15', 15" opposedly and fixedly attached to the mounting brackets 16, 17 and spaced apart from one another with one step member 15" being fixedly attached to the first extended portions 16b, 17b of the mounting brackets 16, 17 and the other step member 15' being fixedly attached to the second extended portions 16a, 17a of the mounting brackets 16, 17. The two step members 15', 15" generally lie in the same horizontal plane and extend in opposite directions to one another with the mounting brackets 16, 17 interconnecting the step members 15', 15". As with the one step member 15' in the preferred embodiment, which is fixedly attached to the second extended portions 16a, 17a, two brace members 22, 23 are fixedly attached to the sides of the other step member 15" and to the first extended portions 16b, 17b to strengthen and support the trailer step. This second embodiment is ideally suited for mounting upon the tongue of the trailer with the step members 15', 15" disposed to either side of the tongue so that the user can easily and safely stand upon the tongue of the trailer and essentially straddle the tongue by standing on the two step members 15', 15". This second embodiment of the trailer step may be further secured to the tongue with holding members such as bolts which may be inserted through the first and second extended portions of the mounting brackets 16, 17 beneath the tongue once the trailer step is mounted upon the tongue.

Various changes and departures may be made to the invention without departing from the spirit and scope thereof. Accordingly, it is not intended that the invention be limited to that specifically described in the specification or as illustrated in the drawings but only as set forth in the claims:

What is claimed is:

1. A quick-attachable trailer step comprising:

a pair of step members each of which has a respective back end and a top;

a plurality of mounting brackets fixedly attached to said pair of step members and interconnecting said pair of step members, each of said mounting brackets having an inverted U shape with an open end which faces downwardly relative to said top of each said step member, each of said mounting brackets further having a first extended portion and a second extended portion spaced from said first extended portion and a second extended portion and substantially resting flat against a tongue of a trailer to substantially secure said trailer step to said tongue; and a plurality of brace members fixedly attached said to mounting brackets and to said step members and being angled from said mounting brackets to said step members to substantially strengthen said quick-attachable trailer step and to prevent said step member from buckling from a user standing upon said step members.

2. A quick-attachable trailer step as described in claim 1, wherein one of said step members is fixedly attached to said first extended portion of each of said mounting brackets and the other of said step members is fixedly attached to said second extended portion of each of said mounting brackets.

3. A quick-attachable trailer step as described in claim 2, wherein said step members essentially lie in a horizontal plane and extend outwardly from said mounting brackets in opposite directions to one another.

4. A quick-attachable trailer step as described in claim 3, wherein each of said mounting brackets has a closed end which removably rests upon said tongue of said trailer with said step members being disposed to either side of said tongue for a user to stand upon.

* * * * *